(12) United States Patent
Lu et al.

(10) Patent No.: US 9,760,218 B2
(45) Date of Patent: Sep. 12, 2017

(54) CAPACITIVE TOUCH PANEL AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Youqiang Lu, Beijing (CN); Tian Zhang, Beijing (CN); Haodi Liu, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 0 days.

(21) Appl. No.: 14/353,396

(22) PCT Filed: Dec. 27, 2013

(86) PCT No.: PCT/CN2013/090708
§ 371 (c)(1),
(2) Date: Apr. 22, 2014

(87) PCT Pub. No.: WO2014/206051
PCT Pub. Date: Dec. 31, 2014

(65) Prior Publication Data
US 2015/0220173 A1    Aug. 6, 2015

(30) Foreign Application Priority Data
Jun. 27, 2013 (CN) .......................... 2013 1 0263938

(51) Int. Cl.
G06F 3/044 (2006.01)
G02F 1/1333 (2006.01)
G06F 3/041 (2006.01)

(52) U.S. Cl.
CPC .......... *G06F 3/044* (2013.01); *G02F 1/13338* (2013.01); *G06F 3/0412* (2013.01); *G06F 2203/04111* (2013.01)

(58) Field of Classification Search
CPC .......... G06F 3/044; G06F 2203/04111; G06F 2203/04107; G02F 1/13338; H03K 17/962; H03K 17/955; G01D 5/24
See application file for complete search history.

(56) References Cited

U.S. PATENT DOCUMENTS

2008/0223628 A1    9/2008  Lyon et al.
2008/0309633 A1*  12/2008  Hotelling .............. G06F 3/0412
                                                                            345/173
(Continued)

FOREIGN PATENT DOCUMENTS

CN      101122698 A    2/2008
CN      101393502 A    3/2009
(Continued)

OTHER PUBLICATIONS

International Search Report mailed Mar. 27, 2014; PCT/CN2013/090708.
(Continued)

*Primary Examiner* — Bryan Earles
(74) *Attorney, Agent, or Firm* — Ladas & Parry LLP

(57) ABSTRACT

Embodiments of the present invention disclose a capacitive touch panel and a display device. The capacitive touch panel comprises an array substrate, an opposing substrate arranged opposite to the array substrate, and a liquid crystal layer
(Continued)

disposed between the opposing substrate and the array substrate, wherein shielding electrodes, touch drive electrodes and touch sensing electrodes are disposed on one side of the opposing substrate away from the liquid crystal layer; the touch drive electrodes, the touch sensing electrodes and the shielding electrodes are insulated from one another; the touch drive electrodes and the touch sensing electrodes are arranged to intersect with each other; and orthographic projections of the shielding electrodes on the opposing substrate fall into gaps of orthographic projections formed by the touch drive electrodes and the touch sensing electrodes arranged to intersect with each other on the opposing substrate. Therefore, the orthographic projections of the shielding electrodes on the opposing substrate are not overlapped with the orthographic projections of the touch drive electrodes or the touch sensing electrodes on the opposing substrate, and hence the structure in which the shielding electrodes are directly opposite to the touch sensing electrodes or the touch drive electrodes can be reduced and the capacitance formed at directly opposite positions can be reduced, and consequently the sensitivity of touch sensing can be improved.

24 Claims, 4 Drawing Sheets

(56) References Cited

U.S. PATENT DOCUMENTS

2009/0085885 A1* 4/2009 Wu et al. .................. 345/173

2010/0066702 A1 3/2010 Lee et al.
2010/0110038 A1 5/2010 Mo et al.
2010/0214262 A1* 8/2010 Ishizaki et al. ............ 345/174
2011/0248953 A1* 10/2011 Lee et al. .................. 345/174
2012/0120011 A1* 5/2012 Teng .................... G06F 3/044
    345/173
2012/0229417 A1* 9/2012 Badaye ............. G06F 3/0416
    345/174
2013/0038574 A1* 2/2013 Chang ................. G06F 3/044
    345/174
2014/0300575 A1 10/2014 Chang

FOREIGN PATENT DOCUMENTS

CN 101581849 A 11/2009
CN 101673001 A 3/2010
CN 102214049 A 10/2011
CN 102541371 A 7/2012
CN 103353818 A 10/2013
CN 203299800 U 11/2013

OTHER PUBLICATIONS

Written Opinion of the International Searching Authority dated Mar. 19, 2014; PCT/CN2013/090708.
First Chinese Office Action Appln. No. 201310263938.8; Dated Aug. 5, 2015.
Second Chinese office Action Appln. N. 201310263938.8; Dated Nov. 2, 2015.
Third Chinese Office Action Appln. No. 2013102639383.8; Dated Jan. 14, 2016.

* cited by examiner ered together to form an LCD with touch function. An on-cell touch panel is obtained by directly producing touch parts on one side of a color filter substrate of an LCD away from a liquid crystal layer. Compared with the add-on mode touch panel, the on-cell touch panel can reduce the thickness of the whole touch panel and improve the light transmission rate.

CAPACITIVE TOUCH PANEL AND DISPLAY DEVICE

TECHNICAL FIELD

Embodiments of the present invention relate to a capacitive touch panel and a display device.

BACKGROUND

With the rapid development of display technology, touch screen panels have been gradually widely applied in people's lives. At present, based on the configuration, touch screen panels include add-on mode touch panels, on-cell touch panels and in-cell touch panels. An add-on mode touch panel is obtained by separately producing a touch screen and a liquid crystal display (LCD) which are adhered together to form an LCD with touch function. An on-cell touch panel is obtained by directly producing touch parts on one side of a color filter substrate of an LCD away from a liquid crystal layer. Compared with the add-on mode touch panel, the on-cell touch panel can reduce the thickness of the whole touch panel and improve the light transmission rate.

Currently, the mainstream LCDs of horizontal electric field broad view angle core technology involve the advanced super dimension switch (ADS) technology. The core technology of the ADS technology is that: multi-dimensional electric fields are formed by electric fields generated on edges of slit electrodes on the same plane and electric fields generated between a slit electrode layer and a plate electrode layer, so that all the alignment liquid crystal molecules between slit electrodes and over electrodes in a liquid crystal cell can be rotated, and hence the working efficiency of liquid crystals and the light transmittance can be improved. The ADS technology can improve the image quality of an LCD and has the advantages of high resolution, high transmittance, low power consumption, wide viewing angle, high aperture opening ratio, low chromatic aberration, non push Mura and the like. Based on different applications, the modified technology of the ADS technology includes high-transmittance I-ADS technology, high-aperture-ratio H-ADS technology, high-resolution S-ADS technology, and the so on.

In general, in an ADS mode LCD, in order to reduce the impact of static in the external environment on the display quality, one whole layer of shielding electrode will be deposited on one side of the color filter substrate of the ADS mode LCD away from the liquid crystal layer; and hence touch parts are disposed on the shielding electrode to finally form an on-cell touch panel. The touch parts specifically include touch sensing electrodes and touch drive electrodes which are arranged and intersect, and metal bridges for bridging adjacent touch drive electrodes or adjacent touch sensing electrodes. In the touch panel with the structure, large capacitance will be formed between the touch drive electrodes or the touch sensing electrodes and the shielding electrodes below the touch drive electrodes or the touch sensing electrodes. The capacitance will reduce the sensitivity of touch sensing and affect the accuracy of touch operation.

SUMMARY

Embodiments of the present invention provide a capacitive touch panel and a display device, which are used for solving the problem of reduced sensitivity of touch sensing due to large capacitance produced between shielding electrodes and touch drive electrodes or touch sensing electrodes.

An embodiment of the present invention provides a capacitive touch panel, which comprises: an array substrate, an opposing substrate arranged opposite to the array substrate, and a liquid crystal layer disposed between the opposing substrate and the array substrate; shielding electrodes, touch drive electrodes and touch sensing electrodes are disposed on one side of the opposing substrate away from the liquid crystal layer; the touch drive electrodes, the touch sensing electrodes and the shielding electrodes are insulated from one another; the touch drive electrodes and the touch sensing electrodes are arranged to intersect with each other; and orthographic projections of the shielding electrodes on the opposing substrate fall in gaps of orthographic projections formed by the touch drive electrodes and the touch sensing electrodes arranged to intersect with each other on the opposing substrate.

An embodiment of the present invention provides a display device, which comprises the capacitive touch panel provided by the embodiment of the present invention.

BRIEF DESCRIPTION OF THE DRAWINGS

Simple description will be given below to the accompanying drawings of the embodiments to provide a more clear understanding of the technical proposals of the embodiments of the present invention. It will be obvious to those skilled in the art that the drawings described below only involve some embodiments of the present invention but are not intended to limit the present invention.

DETAILED DESCRIPTION

For more clear understanding of the objectives, technical proposals and advantages of the embodiments of the present invention, clear and complete description will be given below to the technical proposals of the embodiments of the present invention with reference to the accompanying drawings of the embodiments of the present invention. It will be obvious to those skilled in the art that the preferred embodiments are only partial embodiments of the present invention but not all the embodiments. All the other embodiments obtained by those skilled in the art without creative efforts on the basis of the embodiments of the present invention illustrated shall fall within the scope of protection of the present invention.

Unless otherwise defined, the technical terms or scientific terms used herein have normal meanings understood by those skilled in the art. The words "first", "second" and the like used in the description and the claims of the patent application of the present invention do not indicate the sequence, the number or the importance but are only used for distinguishing different components. Similarly, the words "a", "an" and the like also do not indicate the number but only indicate at least one. The word "comprise", "include" or the like only indicates that an element or a component before the word contains elements or components listed after the word and equivalents thereof, not excluding other elements or components. The words "connection", "connected" and the like are not limited to physical or mechanical connection but may include electrical connection, either directly or indirectly. The words "on", "beneath", "left", "right" and the like only indicate the relative position relationship which is correspondingly changed when the absolute position of a described object is changed.

Further description will be given to the preferred embodiments of the capacitive touch panel and the display device provided by the embodiment of the present invention with reference to the accompanying drawings.

The shape and the size of various films in the accompanying drawings do not reflect the real scale of the touch panel and are only intended to illustrate the content of the present invention.

Figure 1:
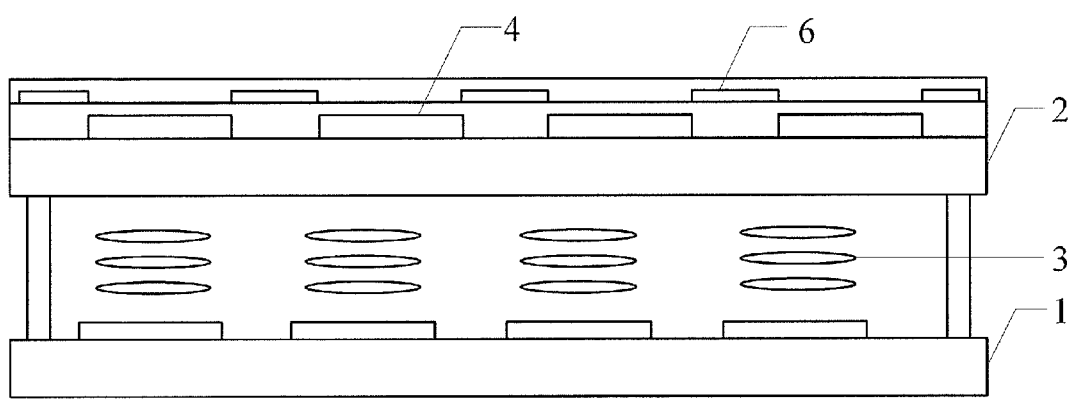
FIG. 1 is a schematic side view of a touch panel provided by an embodiment of the present invention.

An embodiment of the present invention provides a capacitive touch panel. As illustrated in FIG. 1, the capacitive touch panel comprises: an array substrate 1, an opposing substrate 2 arranged opposite to the array substrate 1, and a liquid crystal layer 3 disposed between the opposing substrate 2 and the array substrate 1; and shielding electrodes 4, touch drive electrodes 5 and touch sensing electrodes 6 are disposed on one side of the opposing substrate 2 away from the liquid crystal layer 3.

Figure 2:
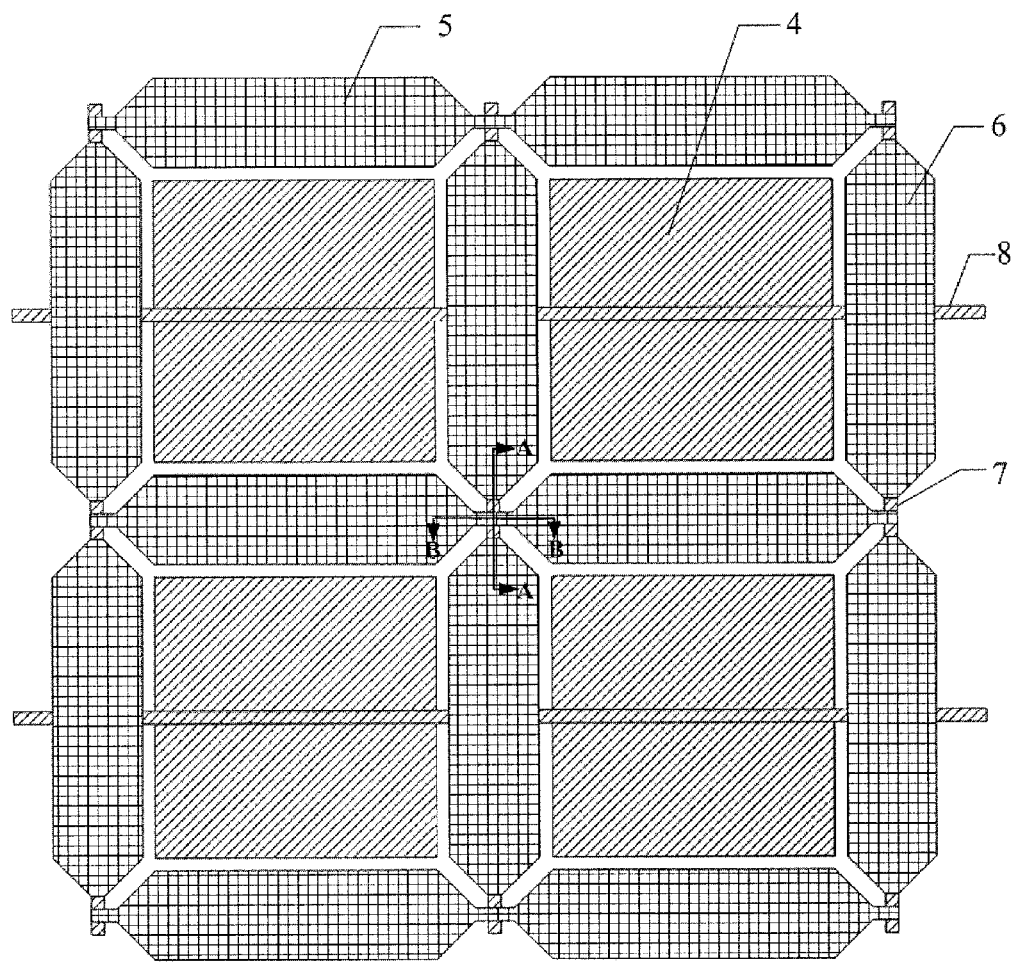
FIG. 2 is a schematic top view of the touch panel provided by the embodiment of the present invention.

As illustrated in FIG. 2, the touch drive electrodes 5, the touch sensing electrodes 6 and the shielding electrodes 4 are insulated from each other; the touch drive electrodes 5 and the touch sensing electrodes 6 are arranged to intersect with each other; and orthographic projections of the shielding electrodes 4 on the opposing substrate 2 fall in gaps of orthographic projections formed by the touch drive electrodes 5 and the touch sensing electrodes 6 arranged to intersect with each other on the opposing substrate.

In the touch panel provided by the embodiment of the present invention, the orthographic projections of the shielding electrodes 4 on the opposing substrate 2 are configured to be not overlapped with the orthographic projections of the touch drive electrodes 5 or the touch sensing electrodes 6 on the opposing substrate 2. Therefore, the structure in which the shielding electrodes 4 are directly opposite to the touch sensing electrodes 6 or the touch drive electrodes 5 can be reduced, and hence the capacitance formed at directly opposite positions can be reduced, and consequently the sensitivity of touch sensing and the accuracy of touch can be improved.

In practice, the touch panel provided by the embodiment of the present invention can be applied to an in-plane switch (IPS) mode LCD, an ADS mode LCD and various ADS mode modified LCDs. No limitation will be imposed thereto here.

For instance, in the touch panel provided by the embodiment of the present invention, the extension directions of the touch drive electrodes 5 and the touch sensing electrodes 6 may be designed to be perpendicular to each other. For instance, as illustrated in FIG. 2, the touch drive electrodes 5 are distributed in the horizontal direction and the touch sensing electrodes 6 are distributed in the vertical direction. In this case, the Y coordinate of a touch point can be determined by sequentially loading touch scanning signals to the touch drive electrodes 5; the X coordinates of the touch points can be determined by coupling the outputs of the touch scanning signals by the touch sensing electrodes 6; and finally the position of the touch points can be positioned. In practice, a certain angle may be fainted between the extension direction of the touch drive electrodes 5 and the extension direction of the touch sensing electrodes 6. No limitation will be imposed thereto here.

For instance, in order to guarantee the consistency of the touch accuracy of the points on the touch panel, when the touch drive electrodes 5 and the touch sensing electrodes 6 are arranged, in general, the intervals between any two adjacent touch drive electrodes 5 are set to be the same, and the intervals between any two adjacent touch sensing electrodes 6 are set to be the same.

Further description will be given to the hierarchical relationship among the shielding electrodes 4, the touch drive electrodes 5 and the touch sensing electrodes 6 in the touch panel provided in an embodiment of the present invention with reference to the following preferred embodiments.

Embodiment 1

In the touch panel provided by the present embodiment of the present invention, as illustrated in FIG. 2, the touch drive electrodes 5 and the touch sensing electrodes 6 may be arranged on the same layer, namely patterns of the touch drive electrodes 5 and the touch sensing electrodes 6 are simultaneously formed by one patterning process. The touch drive electrodes 5 and the touch sensing electrodes 6 arranged on the same layer may be disposed between the shielding electrodes 4 and the opposing substrate 2, namely the touch drive electrodes 5 and the touch sensing electrodes 6 are first formed on the opposing substrate 2, and subsequently the shielding electrodes 4 are formed. Of course, the touch drive electrode 5 and the touch sensing electrode 6 arranged on the same layer may also be disposed on one side of the shielding electrode 4 away from the opposing substrate 2. For instance, as illustrated in FIG. 2, the shielding electrodes 4 are first formed on the opposing substrate 2, and subsequently the touch drive electrodes 5 and the touch sensing electrodes 6 are formed. No limitation will be imposed thereto here.

Figure 3A:
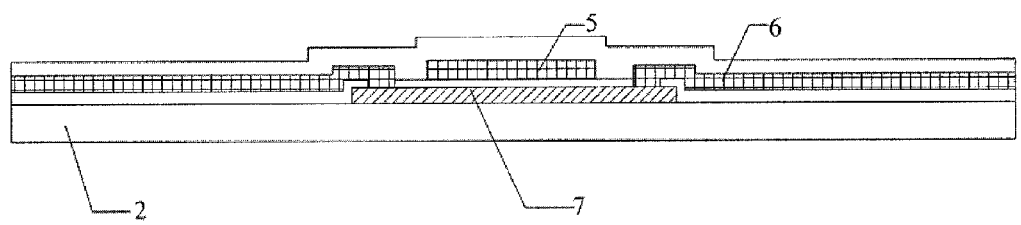
FIG. 3a is a schematic sectional view of FIG. 2 in the A-A direction.
Figure 3B:
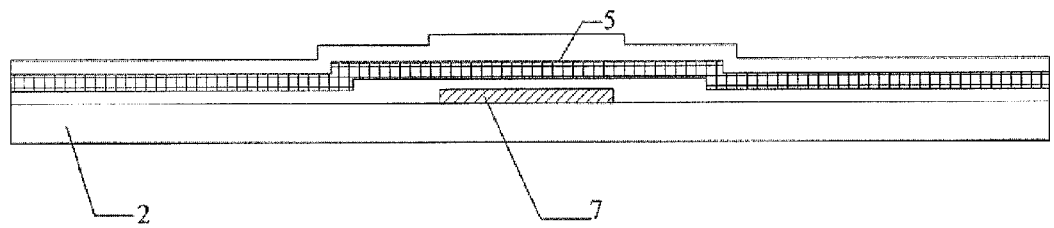
FIG. 3b is a schematic sectional view of FIG. 2 in the B-B direction.

Moreover, in order to ensure that the touch drive electrodes 5 and the touch sensing electrodes 6 on the same layer are insulated from each other, bridging structures are generally disposed at intersection positions of the touch drive electrodes 5 and the touch sensing electrodes 6. More specifically, the touch drive electrodes 5 may be bridged by first bridging electrodes at the intersection positions of the touch drive electrodes 5 and the touch sensing electrodes 6; or as illustrated in FIG. 2, the touch sensing electrodes 6 may be bridged by second bridging electrodes 7 at the intersection positions of the touch sensing electrodes 6 and the touch drive electrodes 5. No limitation will be imposed thereto here. FIG. 3a is a sectional view of FIG. 2 at the A-A position, and the touch sensing electrodes 6 are connected with each other by the second bridging electrodes 7. FIG. 3b is a sectional view of FIG. 2 at the B-B position.

Moreover, the first bridging electrodes and the second bridging electrodes may be made of a transparent conductive material such as indium tin oxide (ITO) or indium zinc oxide (IZO) and may also be made of an opaque metallic material. When the first bridging electrodes or the second bridging electrodes are made of a transparent conductive material, in order to reduce the amount of processing steps, the first or the second bridging electrodes may be arranged on the same layer as the shielding electrodes 4. For instance, as illustrated in FIG. 2, the second bridging electrodes 7 may be arranged on the same layer as the shielding electrodes 4.

Furthermore, as illustrated in FIG. 2, the wiring direction of signal lines 8 arranged on the same layer as the shielding electrodes 4 and connected with the shielding electrodes 4 may be the same as the extension direction of the touch drive electrodes 5, or may be the same as the extension directions of the touch sensing electrodes 6. No limitation will be imposed thereto here. The signal lines 8 are configured to apply same shielding electrode signals to the shielding electrodes 4, and the shielding electrode signals are usually zero voltage.

Embodiment 2

Figure 4:
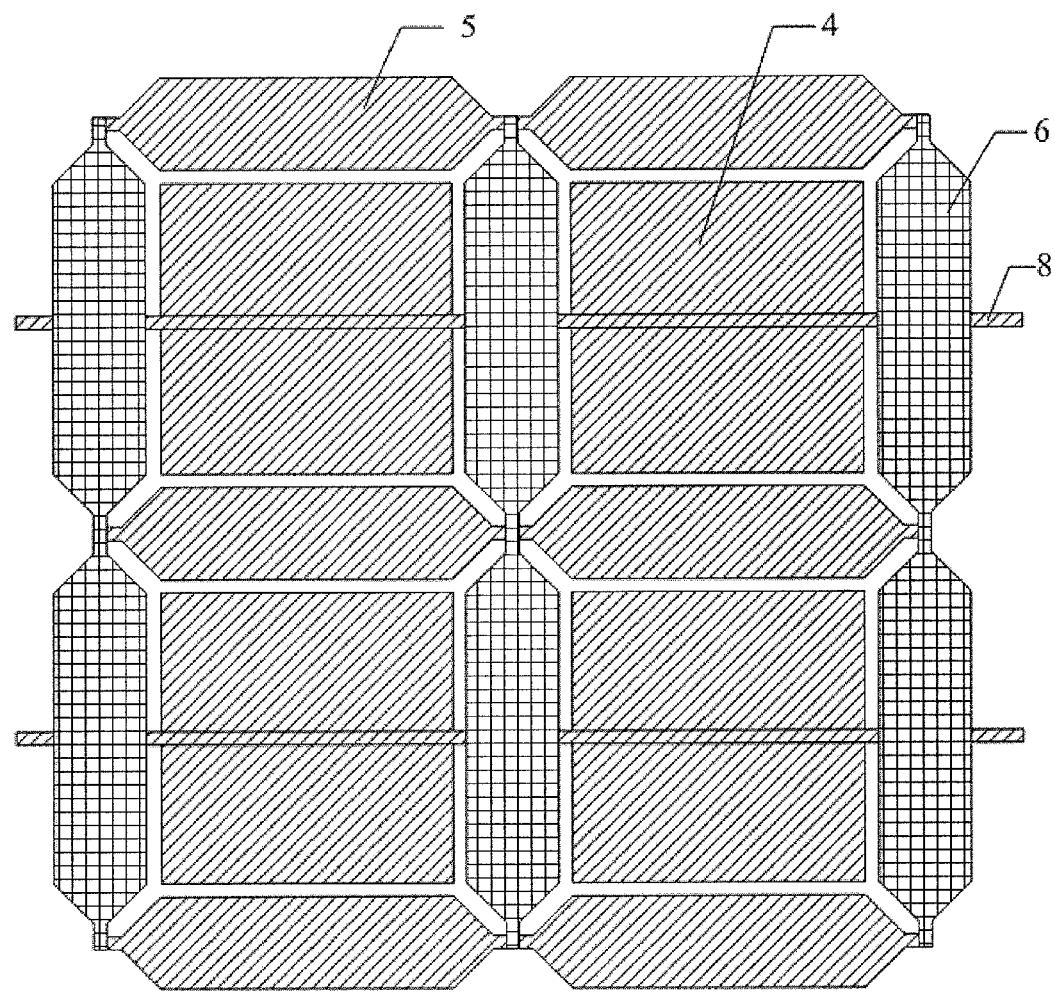
FIG. 4 is a schematic top view of a touch panel provided by another embodiment of the present invention.

In the touch panel provided by the present embodiment of the present invention, as the orthographic projections of the touch drive electrodes 5 on the opposing substrate 2 are not overlapped with the orthographic projections of the shielding electrodes 4 on the opposing substrate 2, as illustrated in FIG. 4, the touch drive electrodes 5 may be arranged on the same layer as the shielding electrodes 4, namely patterns of the touch drive electrodes 5 and the shielding electrodes 4 are simultaneously formed by one patterning process.

As illustrated in FIG. 4, the touch drive electrodes 5 and the shielding electrodes 4 arranged on the same layer may be disposed between the touch sensing electrodes 6 and the opposing substrate 2, namely the touch drive electrodes 5 and the shielding electrodes 4 are first formed on the opposing substrate 2, and subsequently the touch sensing electrodes 6 are formed. Of course, the touch drive electrode 5 and the shielding electrode 4 arranged on the same layer may also be disposed on one side of the touch sensing electrode 6 away from the opposing substrate 2, namely the touch sensing electrode 6 is first formed on the opposing substrate 2, and subsequently the touch drive electrode 5 and the shielding electrode 4 are formed. No limitation will be imposed thereto here. Because the touch drive electrodes 5 and the touch sensing electrodes 6 are arranged on different layers, first bridging electrodes and second bridging electrodes may be not required.

Moreover, as illustrated in FIG. 4, the wiring direction of signal lines 8 arranged on the same layer as the shielding electrodes 4 and connected with the shielding electrodes 4 must be consistent with the extension direction of the touch drive electrodes 5, so that the intersection of the signal lines 8 and the touch drive electrodes 5 can be avoided. The signal lines 8 are configured to apply same shielding electrode signals to the shielding electrodes 4, and the shielding electrode signals are usually zero volt.

Embodiment 3

Figure 5:
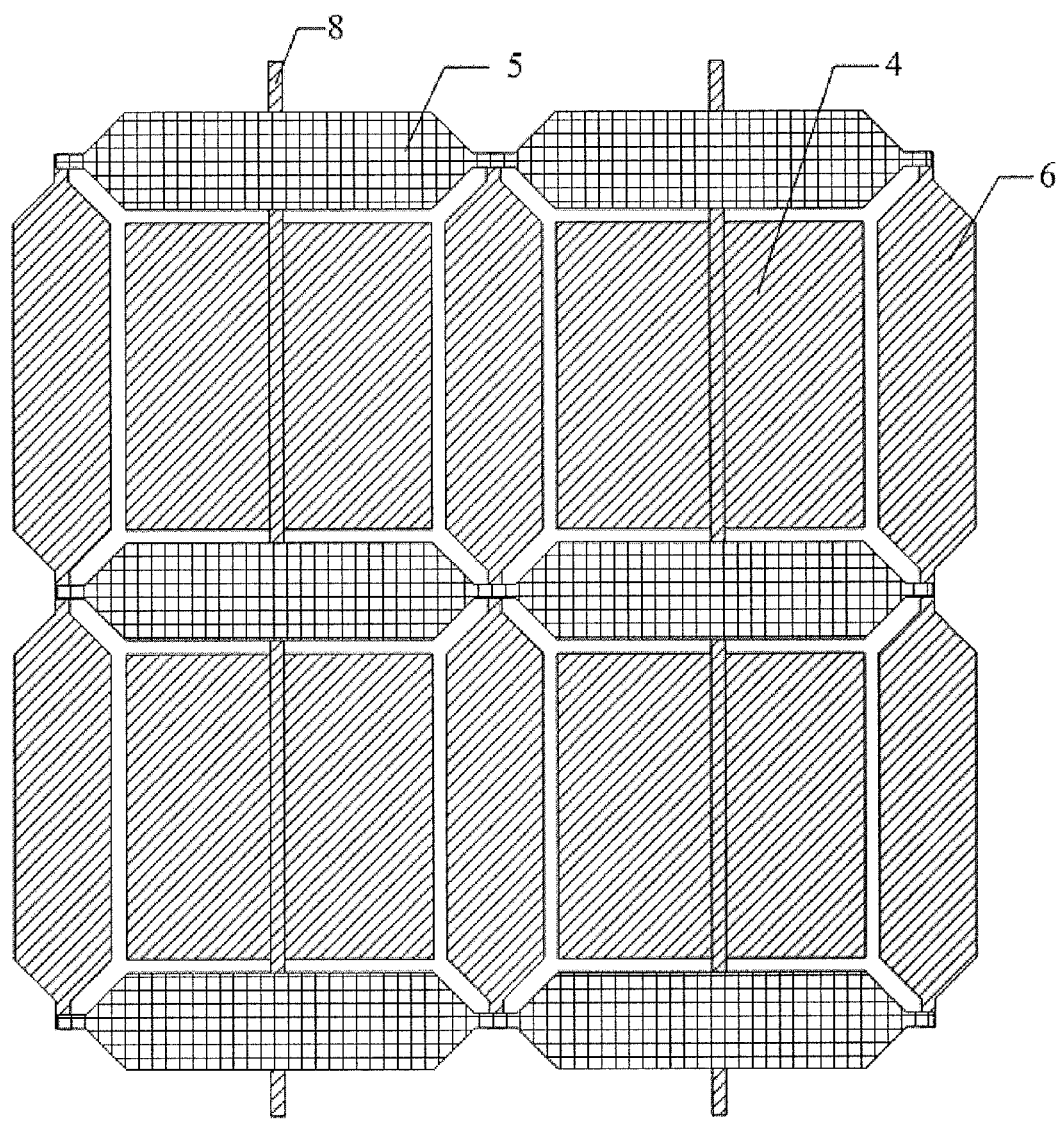
FIG. 5 is a schematic top view of a touch panel provided by still another embodiment of the present invention.

In the touch panel provided by the present embodiment of the present invention, as the orthographic projections of the touch sensing electrodes 6 on the opposing substrate 2 are not overlapped with the orthographic projections of the shielding electrodes 4 on the opposing substrate 2, as illustrated in FIG. 5, the touch sensing electrodes 6 may be arranged on the same layer as the shielding electrodes 4, namely patterns of the touch sensing electrodes 6 and the shielding electrodes 4 are simultaneously formed by one patterning process.

As illustrated in FIG. 5, the touch sensing electrodes 6 and the shielding electrodes 4 arranged on the same layer may be disposed between the touch drive electrodes 5 and the opposing substrate 2, namely the touch sensing electrodes 6 and the shielding electrodes 4 are first formed on the opposing substrate 2, and subsequently the touch drive electrodes 5 are formed. Of course, the touch sensing electrode 6 and the shielding electrode 4 arranged on the same layer may also be disposed on one side of the touch drive electrode 5 away from the opposing substrate 2, namely the touch drive electrode 5 is first formed on the opposing substrate 2, and subsequently the touch sensing electrode 6 and the shielding electrode 4 are formed. No limitation will be imposed thereto here. As the touch drive electrodes 5 and the touch sensing electrodes 6 are arranged on different layers, first bridging electrodes and second bridging electrodes may be not required.

Moreover, as illustrated in FIG. 5, the wiring direction of signal lines 8 arranged on the same layer as the shielding electrodes 4 and connected with the shielding electrodes 4 must be consistent with the extension direction of the touch sensing electrodes 6, so that the intercrossing of the signal lines 8 and the touch sensing electrodes 6 can be avoided. The signal lines 8 are configured to apply same shielding electrode signals to the shielding electrodes 4, and the shielding electrode signals are usually zero volt.

Based on the same invention concept, an embodiment of the present invention further provides a display device, which comprises the capacitive touch panel provided by any embodiment of the present invention. The display device may be any product or component with display function such as a mobile phone, a tablet PC, a television, a display, a notebook PC, a digital picture frame and navigator. The implementation of the display device may refer to the embodiments of the capacitive touch panel. No further repeated description will be given here.

In the capacitive touch panel and the display device provided by the embodiments of the present invention, the shielding electrodes, the touch drive electrodes and the touch sensing electrodes are disposed on one side of the opposing substrate away from the liquid crystal layer; the touch drive electrodes, the touch sensing electrodes and the shielding electrodes are insulated from one another; the touch drive electrodes and the touch sensing electrodes are arranged to intersect with each other; and the orthographic projections of the shielding electrodes on the opposing substrate fall into the gaps of the orthographic projections formed by the touch drive electrodes and the touch sensing electrodes arranged to intersect with each other on the opposing substrate, namely the orthographic projections of the shielding electrodes on the opposing substrate are not overlapped with the orthographic projections of the touch drive electrodes or the touch sensing electrodes on the opposing substrate. Because the structure in which the shielding electrodes are directly opposite to the touch sensing electrodes or the touch drive electrodes is reduced, the capacitance formed at the directly opposite positions can be reduced, and hence the sensitivity of touch sensing and the accuracy of touch can be improved.

Obviously, various modifications and deformations can be made by those skilled in the art without departing from the spirit and scope of the present invention. Therefore, if the modifications and deformations of the present invention fall within the scope of the appended claims of the present invention and equivalents thereof, the present invention is also intended to include the modifications and deformations.

The invention claimed is:

1. A capacitive touch panel, comprising: an array substrate, an opposing substrate arranged opposite to the array substrate, and a liquid crystal layer disposed between the opposing substrate and the array substrate, wherein shielding electrodes, touch drive electrodes and touch sensing electrodes are disposed on one side of the opposing substrate away from the liquid crystal layer;

the touch drive electrodes, the touch sensing electrodes and the shielding electrodes are insulated from one another; the touch drive electrodes and the touch sensing electrodes are arranged to intersect with each other; orthographic projections of the shielding electrodes on the opposing substrate fall into gaps of orthographic projections formed by the touch drive electrodes and the touch sensing electrodes arranged to intersect with each other on the opposing substrate, the orthographic projections of the shielding electrodes on the opposing substrate are not overlapped with the orthographic projections of the touch drive electrodes or the touch sensing electrodes on the opposing substrate, the shielding electrodes are applied with shielding electrode signals, and the touch drive electrodes are bridged by first bridging electrodes, and the orthographic projections of the shielding electrodes on the opposing substrate are not overlapped with the orthographic projections of the first bridging electrodes on the opposing substrate, wherein the touch drive electrodes and the shielding electrodes are arranged on the same layer; and the touch drive electrode and the shielding electrode are disposed between the touch sensing electrode and the opposing substrate or disposed on one side of the touch sensing electrode away from the opposing substrate.

2. The capacitive touch panel according to claim 1, wherein extension directions of the touch drive electrodes and the touch sensing electrodes are perpendicular to each other.

3. The capacitive touch panel according to claim 1, wherein intervals between any two adjacent touch drive electrodes are the same; and intervals between any two adjacent touch sensing electrodes are the same.

4. The capacitive touch panel according to claim 1, wherein the touch drive electrodes and the touch sensing electrodes are arranged on a same layer; and the touch drive electrodes are bridged by the first bridging electrodes at intersection positions of the touch drive electrodes and the touch sensing electrodes, or the touch sensing electrodes are bridged by second bridging electrodes at the intersection positions of the touch sensing electrodes and the touch drive electrodes.

5. The capacitive touch panel according to claim 4, wherein the first bridging electrodes and the shielding electrodes are arranged on a same layer; and the second bridging electrodes and the shielding electrodes are arranged on a same layer.

6. The capacitive touch panel according to claim 4, wherein the touch drive electrode and the touch sensing electrode are disposed between the shielding electrode and the opposing substrate or disposed on one side of the shielding electrode away from the opposing substrate.

7. A capacitive touch panel, comprising: an array substrate, an opposing substrate arranged opposite to the array substrate, and a liquid crystal layer disposed between the opposing substrate and the array substrate, wherein shielding electrodes, touch drive electrodes and touch sensing electrodes are disposed on one side of the opposing substrate away from the liquid crystal layer;

the touch drive electrodes, the touch sensing electrodes and the shielding electrodes are insulated from one another; the touch drive electrodes and the touch sensing electrodes are arranged to intersect with each other; orthographic projections of the shielding electrodes on the opposing substrate fall into gaps of orthographic projections formed by the touch drive electrodes and the touch sensing electrodes arranged to intersect with each other on the opposing substrate, the orthographic projections of the shielding electrodes on the opposing substrate are not overlapped with the orthographic projections of the touch drive electrodes or the touch sensing electrodes on the opposing substrate, the shielding electrodes are applied with shielding electrode signals, and the touch drive electrodes are bridged by first bridging electrodes, and the orthographic projections of the shielding electrodes on the opposing substrate are not overlapped with the orthographic projections of the first bridging electrodes on the opposing substrate, wherein the touch sensing electrodes and the shielding electrodes are arranged on the same layer; and the touch sensing electrode and the shielding electrode are disposed between the touch drive electrode and the opposing substrate or disposed on one side of the touch drive electrode away from the opposing substrate.

8. A display device, comprising the capacitive touch panel according to claim 1.

9. The capacitive touch panel according to claim 5, wherein the touch drive electrode and the touch sensing electrode are disposed between the shielding electrode and the opposing substrate or disposed on one side of the shielding electrode away from the opposing substrate.

10. The capacitive touch panel according to claim 2, wherein the touch drive electrodes and the touch sensing electrodes are arranged on a same layer; and the touch drive electrodes are bridged by the first bridging electrodes at intersection positions of the touch drive electrodes and the touch sensing electrodes, or the touch sensing electrodes are bridged by second bridging electrodes at the intersection positions of the touch sensing electrodes and the touch drive electrodes.

11. The capacitive touch panel according to claim 10, wherein the first bridging electrodes and the shielding electrodes are arranged on a same layer; and the second bridging electrodes and the shielding electrodes are arranged on a same layer.

12. The capacitive touch panel according to claim 10, wherein the touch drive electrode and the touch sensing electrode are disposed between the shielding electrode and the opposing substrate or disposed on one side of the shielding electrode away from the opposing substrate.

13. The capacitive touch panel according to claim 2, wherein the touch drive electrodes and the shielding electrodes are arranged on the same layer; and the touch drive electrode and the shielding electrode are disposed between the touch sensing electrode and the opposing substrate or disposed on one side of the touch sensing electrode away from the opposing substrate.

14. The capacitive touch panel according to claim 2, wherein the touch sensing electrodes and the shielding electrodes are arranged on the same layer; and the touch sensing electrode and the shielding electrode are disposed between the touch drive electrode and the opposing substrate or disposed on one side of the touch drive electrode away from the opposing substrate.

15. The capacitive touch panel according to claim 3, wherein the touch drive electrodes and the touch sensing electrodes are arranged on a same layer; and the touch drive electrodes are bridged by the first bridging electrodes at intersection positions of the touch drive electrodes and the touch sensing electrodes, or the touch sensing electrodes are bridged by second bridging electrodes at the intersection positions of the touch sensing electrodes and the touch drive electrodes.

16. The capacitive touch panel according to claim 15, wherein the first bridging electrodes and the shielding electrodes are arranged on a same layer; and the second bridging electrodes and the shielding electrodes are arranged on a same layer.

17. The capacitive touch panel according to claim 15, wherein the touch drive electrode and the touch sensing electrode are disposed between the shielding electrode and the opposing substrate or disposed on one side of the shielding electrode away from the opposing substrate.

18. The capacitive touch panel according to claim 3, wherein the touch drive electrodes and the shielding electrodes are arranged on the same layer; and
the touch drive electrode and the shielding electrode are disposed between the touch sensing electrode and the opposing substrate or disposed on one side of the touch sensing electrode away from the opposing substrate.

19. The capacitive touch panel according to claim 3, wherein the touch sensing electrodes and the shielding electrodes are arranged on the same layer; and the touch sensing electrode and the shielding electrode are disposed between the touch drive electrode and the opposing substrate or disposed on one side of the touch drive electrode away from the opposing substrate.

20. The capacitive touch panel according to claim 7, wherein extension directions of the touch drive electrodes and the touch sensing electrodes are perpendicular to each other.

21. The capacitive touch panel according to claim 7, wherein intervals between any two adjacent touch drive electrodes are the same; and intervals between any two adjacent touch sensing electrodes are the same.

22. The capacitive touch panel according to claim 7, wherein the touch drive electrodes and the touch sensing electrodes are arranged on a same layer; and
the touch drive electrodes are bridged by the first bridging electrodes at intersection positions of the touch drive electrodes and the touch sensing electrodes, or the touch sensing electrodes are bridged by second bridging electrodes at the intersection positions of the touch sensing electrodes and the touch drive electrodes.

23. The capacitive touch panel according to claim 22, wherein the first bridging electrodes and the shielding electrodes are arranged on a same layer; and the second bridging electrodes and the shielding electrodes are arranged on a same layer.

24. The capacitive touch panel according to claim 22, wherein the touch drive electrode and the touch sensing electrode are disposed between the shielding electrode and the opposing substrate or disposed on one side of the shielding electrode away from the opposing substrate.

* * * * *